United States Patent Office 3,830,757
Patented Aug. 20, 1974

3,830,757
CATALYST FOR THE PREPARATION OF CARBONYL CONTAINING COMPOSITIONS
Anthony B. Evnin, Chappaqua, Jule A. Rabo, Armonk, and Louis F. Elek, and Alan P. Risch, Peekskill, and Spiro J. Kavarnos, Ossining, N.Y., assignors to Union Carbide Corporation, New York, N.Y.
No Drawing. Continuation-in-part of application Ser. No. 59,338, July 28, 1970, which is a continuation-in-part of application Ser. No. 853,974, Aug. 28, 1969, both now abandoned. This application Feb. 24, 1971, Ser. No. 118,477
Int. Cl. B01j 11/08
U.S. Cl. 252—464                                25 Claims

ABSTRACT OF THE DISCLOSURE

Carbonyl-containing compositions, such as aldehydes and ketones, are selectively and conveniently prepared in high yields and at high efficiencies by a catalytic vapor phase process which comprises contacting unsaturated compounds with oxygen in the presence of a novel catalyst containing a vanadium oxide doped with at least one, and preferentially two or more, transition metals or transition metal-containing compounds, one of which is, or contains, palladium. The catalysts employed are highly active and selective at moderate temperatures and pressures and have industrially useful lifetime.

---

This application is a continuation-in-part of U.S. application Ser. No. 59,338, entitled "Process for the Preparation of Carbonyl-Containing Compositions, and Novel Catalysts Therefor," filed July 28, 1970 now abandoned. Ser. No. 59,338 is in turn a continuation-in-part of Ser. No. 853,974, filed Aug. 28, 1969, now abandoned.

This invention relates, in general, to a process for the preparation of carbonyl-containing compositions. In one aspect this invention is directed to the selective preparation of acetaldehyde from ethylene in relatively high yields and at high efficiencies. In a further aspect this invention relates to a novel catalyst useful for effecting the aforementioned process. In another aspect, this invention is directed to a process for the preparation of the catalyst.

It is well known in the literature that the reaction of certain noble metal salts with olefins, oxygen and water in homogeneous or slurried systems affords carbonyl and carboxylic compounds. For example, see German Pats. 1,049,845; 1,061,767; 1,123,312; and U.S. Pats. 3,057,915; 3,076,032; and 3,080,425. Particularly prominent in the literature are cases in which palladium salts are utilized in conjunction with another metal salt such as a cupric salt which is an effective component of a redox system. Numerous variations of these systems have also been disclosed in the literature and utilized in the preparation of carbonyl or carboxylic compounds.

However, the homogeneous systems described above suffer from several disadvantages. In particular, these systems typically require the presence of strong acids, such as HCl, which necessitates utilization of special and costly corrosion-resistant equipment. In addition catalyst lifetimes are generally a problem due to precipitation or reduction and plating out of the expensive noble metal; thus recovery and reconstitution of the catalyst is generally difficult and costly. Finally, product purification constitutes a complication in continuous flow operation for all but acetaldehyde, the most volatile product, and in that case removal of chlorinated by-products is troublesome.

Many of the problems that plague direct oxidations of olefins to carbonylic compounds in the liquid phase would not be present were operations to be carried out in the gas phase with a heterogeneous contact catalyst. In particular, corrosion problems and the expensive recovery of noble metal from the product should be eliminated.

There are, in fact, a number of catalyst systems reported in the literature which are purported to be satisfactory solid contact agents for direct vapor phase conversion of olefins to carbonylic compounds. Although some of these systems do solve one or more of the problems present in the homogeneous systems, none appears to combine all the necessary properties of activity at moderate temperatures and pressures, high selectivity, facility of operation in inexpensive conventional equipment and industrially useful lifetimes (see the commentary in "Ethylene and Its Derivatives," ed. S. A. Miller, Ernest Benn Ltd., London, 1969, p. 650). In particular, systems which utilize a catalyst of the type common in the homogeneous phase, for example, palladium salts and copper salts wherein the catalyst is merely deposited on a support, show activity in some cases but are not stable for industrially useful periods; the activity and/or selectivity of these catalysts decline within a day or even a few hours under virually all conditions of operation. Moreover, thse catalysts require continuous or frequent regeneration with highly corrosive hydrochloric acid. A likely cause of the rapid decline in the effectiveness of these catalysts is the absence of an efficient mechanism for the reoxidation of the noble metal.

Somewhat more successful are systems using noble metals and molybdenum trioxide or heteropolymolybdates (see, for example, U.S. Pat. 3,379,651), or phosphate-molybdate combinations without the noble metal (see British Pat. 990,639). The former system, however, appear to lack industrially useful stability since the necessity of frequent regeneration was implied. Furthermore, in olefins containing allylic hydrogens the preferred point of attack with these catalysts is at the allylic position and not at the double bond since propylene affords acrolein rather than acetone. The relatively high temperature of 220° C. was employed for this reaction. The latter system where no noble metal is employed requires temperatures of 230–350° C. to achieve modest conversions for ethylene or propylene, and the large volumes of steam utilized would complicate product separation in industrial operation.

Catalysts containing a combination of palladium and either vanadium pentoxide or molybdenum trioxide have been employd for the direct conversion of ethylene to acetic acid as set forth in U.S. Pat. 3,240,805. However, it is emphasized and stated in the examples that under the conditions utilized no acetaldehyde was detected among the products. Similarly, French Pat. 1,568,-742 is also directed to a process for the preparation of acetic acid from ethylene. In the several examples cited, the formation of acetaldehyde was mentioned only once, and then only as a minor by-product.

It is therefore an object of this invention to provide a vapor phase process for the preparation of carbonyl-containing compositions wherein many of the disadvantages heretofore known have been eliminated or minimized. Another object of this invention is to provide a process whereby the aforementioned compounds are prepared selectively and in high yields. A further object of the invention is to provide a vapor phase process for the selective preparation of acetaldehyde from ethylene in high yields and high efficiencies. A still further object of this invention is to provide a vapor phase process for the selective preparation of acetone from propylene. Another object of this invention is to provide a novel catalyst containing a vanadium oxide and at least one, and preferentially two or more transition metals or transition metal-containing compounds, one of which is, or contains, palladium. A further object of this invention is to provide a novel catalyst containing a vanadium oxide, palladium or a palladium-containing compound, and titanium or a titanium-containing compound. A still further object is to provide a catalyst which has an industrially useful lifetime without replacement or reconstitution and without the necessity for frequent regeneration (operation for a period of at least one week is possible between in situ reactivations). These and other objects will readily become apparent to those skilled in the art in the light of the teachings herein set forth.

In its broad aspect, the present invention is directed to a catalytic vapor phase process for the preparation of carbonyl-containing compositions selected from the group consisting of aldehydes and ketones.

The process comprises contacting, usually at a temperature not in excess of about 200° C., and substantially in the vapor phase and in the presence of oxygen and water, an unsaturated hydrocarbon with a solid catalyst. The catalyst contains, as its critical catalytic component, a vanadium oxide doped with minor portions of at least one of the following constituents:

(a) palladium or palladium-containing compounds,
(b) palladium or palladium-containing compounds and titanium or titanium-containing compounds, and
(c) palladium or palladium-containing compounds and metal or metal-containing compounds wherein said metal is selected from the group consisting of platinum, ruthenium, iridium, or osmium and thereafter recovering said carbonyl-containing compositions.

The invention also encompasses a novel catalyst employed in this process as well as a method for its preparation.

As employed in the specification and appended claims the term "transition elements" means those elements which have partly filled d and f shells in any of their commonly occurring oxidation states (Cotton and Wilkinson, Advanced Inorganic Chemistry, 2nd Ed., p. 625, 1967). By the term "noble metals" is meant those metals defined as the "platinum metals" on page 980 of the cited text reference. These metals are rhodium, ruthenium, palladium, osmium, iridium and platinum.

By the term "doping" (or "doped") as employed throughout the specification is meant a treatment which results in an intimate chemical interaction between the vanadium component and one or more of the other active components used in the preparation of the catalyst. These other active components are usually, but not always, present in a minor amount relative to the vanadium component. The preferred treatment is to heat the combination of components.

As herein before indicated the process of this invention provides a selective method for the preparation of aldehydes and ketones employing a novel catalyst which is highly selective at low temperatures and pressures and has an industrially useful lifetime. No specialized equipment is needed since severely corrosive conditions are not present in the reaction chamber. The process operates in the vapor phase and separation of the products is uncomplicated. The catalyst can be employed for weeks or even months without significant changes in conversion or selectivity and after such a period the activity can be fully restored by a brief heat treatment with an oxygen-containing gas.

An outstanding and major feature of this invention is the combination of high activity, selectivity and stability in a single system. Operating at conversion as high as 60%, efficiencies of about 90% to useful products can be obtained. Efficiencies to a single product, e.g., ethylene to acetaldehyde, of 80–85% can be obtained. Another unique feature of this invention is the ability to operate at low temperatures. Many of the prior art processes require temperatures in excess of 200° C.

In contrast, the process of this invention can be effected at temperatures of from about 60° to about 200° C., (still higher temperatures may be utilized if contact times are short), and for the preparation of acetaldehyde more preferably from about 100° to about 180° C. at 1 atmosphere. Moreover, pressure is not critical; the process can be conducted at any pressures required by practical consideration, such as from 1 to 50 atmospheres, or higher.

The unexpected and outstanding advantages obtained by the process of this invention reside, in part, in (1) the unique combination of transition metal compounds employed in the catalyst composition and (2) the method of preparation of the catalyst.

It has been demonstrated that the vanadium component of the catalyst with or without an inert support is by itself inactive for direct oxidation of ethylene even at 200° C. Above this temperature only low activity and little or no selectivity has been observed. With propylene and butene, some activity is observed below 200° C. but substantially less than for the palladium-containing catalysts of this invention. Moreover, the use of noble metal compounds in the absence of a vanadium oxide gives low activity and drastically reduces the stability of the catalyst for the production of carbonyl-containing compositions. Hence, such catalysts are not suitable for industrial applications.

Thus, there are two components which have been found to be critical to the catalyst employed in the instant process. The first component of the catalyst must be a vanadium oxide, such as vanadium pentoxide; it is preferred that the vanadium oxide is doped with titanium. The second component of the catalyst is or contains palladium. In addition, to the palladium and vanadium components, the catalyst may also contain a second noble metal component which is or contains platinum, ruthenium, iridium or osmium.

As previously indicated the vanadium oxide is a critical component of the catalytically active species. In most cases, the catalyst should be comprised of from about 1 to 99.5 weight percent of the vanadium oxide. However, part of the vanadium can be replaced by another transition metal of good redox properties such as tungsten, molybdenum, niobium, tantalum, and the like, which metals themselves alone or in combination with palladium show no or only insignificant activity. For example, when part of the vanadium was replaced with tungsten such that vanadium and tungsten were present in an atomic ratio of 1 to 4, the catalyst showed good activity, whereas when tungsten replaced all the vanadium the catalyst was totally inactive. Atomic ratios of vanadium to tungsten of up to 1 to 12. can also be employed. The palladium or palladium-containing component can be present in the range of from about 0.001 to 20 weight percent, based on the total weight of catalyst and calculated as the noble metal. The catalyst can be unsupported but preferentially it is supported. In the case of a supported catalyst system the preferred catalysts are those wherein the vanadium oxide is present within the range of from about 1 to about 30 weight percent, and still more preferably from about 3 to about 20 weight percent, and the palladium component from about 0.01 to about 3 weight percent, and still more preferably from about 0.01 to about 1.0 weight percent, all calculated as the metal based on the total weight of the catalyst.

It has been found that the presence of titanium significantly improves the performance and, in particular, the activity of the vanadium oxide-palladium catalyst. Its application permits reduction of the palladium content while maintaining high catalyst productivity. The presence of titanium also permits operation at lower temperatures without loss of productivity; better efficiencies are obtained at the lower temperature. The titanium can be applied in amounts as little as 0.01% by weight or as much as 40% by weight of the vanadium oxide; advantages are realized throughout the range. The titanium-vanadium combination in the absence of palladium oxidized little or no ethylene under the typical reaction conditions.

The presence of another noble metal, in addition to the vanadium and palladium components, was also found to impart increased activity. For instance, in the case of ethylene the addition of as little as 0.1 percent ruthenium which was approximately 10 weight percent based on the weight of palladium, produced a marked increase in activity. In contrast a catalyst containing only Ru and $V_2O_5$ (i.e., no palladium present) was inactive under the same reaction conditions. However, when the three components were employed together, an unexpected and large increase in activity was obtained. This synergistic effect which is only observed when one of several specific noble metal couples are employed permits operation at lower temperatures at which conditions better efficiencies may be achieved.

In addition to ruthenium, the metals, platinum, iridium and osmium provide a synergistic increase in activity similar to ruthenium when employed as a third component of the catalyst. When a third component is employed it can be present in the catalyst within a similar concentration range as that of palladium, i.e., from about 0.001 to about 3 weight percent, and preferably from about 0.01 to about 1.0 weight percent, calculated as the metal.

The composition of the catalyst is not restricted to one containing vanadium oxide and palladium, vanadium oxide-titanium and palladium, or vanadium oxide-palladium and the second noble metal component as described above. It has been found that the performance of the catalyst of this invention can be significantly improved if the noble metal component is applied in the form of a compound containing the noble metal, an additional transition metal such as vanadium, chromium and titanium, and oxygen. Consequently, upon application of these noble metal components the additional transition metal is also incorporated in the catalyst.

The catalysts of this invention can be employed without a support, in which case small amounts of binder such as silica, clay, and the like may be added to improve structural strength. The catalyst can also be contained on an inert low surface area carrier (typically less than 10 meters$^2$/gram) such as alpha-aluminum oxide, silicon carbide, zirconium dioxide, zinc oxide, porous glass, and the like. Whether a support is employed or not, will largely be dependent upon the particular equipment utilized in the preparation of the carbonyl-containing composition.

To obtain a catalyst with superior performance it is desirable that the preparation of the catalyst is carried out in such a way that the vanadium oxide component is present in a small particle size, preferentially of less than one micron. Excellent catalysts are prepared by the spray deposition of a solution or solutions containing the major catalytic components onto alpha-aluminum oxide with a concurrent and rapid removal of the solvent (spray-dry technique).

The temperature applied in the spray-dry technique may be chosen in such a way as to afford not only the removal of the solvent but also to induce the formation of the vanadium oxide phase and the formation of a vanadium oxide-noble metal interface which is important for the unique stability, required for industrial application.

Another technique for the preparation of the catalyst involves application of the palladium to a preformed vanadium oxide phase through ion exchange either with the hydrogen or hydroxyls of the vanadium oxide surface. The ion exchanged system is then heated with an oxygen-containing gas to afford the active catalyst.

The doping of the vanadium oxide by titanium, titanium-containing compounds, by the palladium compounds or by the additional noble metal can also be carried out in an independent step. In this step the catalyst preferentially containing all substantial components is heat treated, generally in an oxygen-containing gas such as ambient air. Since a strong interaction between the vanadium oxide and other metal components is important for catalyst stability and industrially useful lifetimes, chemical additives or noble metal-transition metal compounds may be applied in catalyst preparation in addition to the heat treatment in order to facilitate the interaction.

In the activation of the catalyst it has been observed that temperatures of from about 200° C. to about 500° C. and heating periods in excess of 3 hours are satisfactory, such as at least 5 hours. In practice, the doping is essentially completed after heating for about 16 hours at 400° C. Lower temperatures, of course, require the longer heating periods.

As indicated above the doping step whether performed concurrently with spray-drying or as a separate step, is essential to provide a catalyst which is selective, active and stable for the oxidation of olefins. Moreover, the combination of thermal activation with a spray deposition of the active component provides uniformity, prevents the growth of large crystallites, eliminates peeling or leaching of the catalyst, and generally affords a stable, active and selective catalyst.

In practice, it has been found that a wide variety of vanadium and noble metal compounds, including the noble metals themselves, can be employed in the preparation of the catalyst of this invention. For the first component of the catalyst, i.e., the vanadium oxide, illustrative starting materials include, among others ammonium vanadate, vanadyl halides, such as vanadyl chloride, organic vanadium compounds such as vanadyl acetonlyacetonate, and the like. The only requirement of the starting material is that it can be converted to the oxide, in the activation step of this invention. When the vanadium is to be doped with titanium, the titanium can be introduced in a variety of forms. Illustrative titanium compounds which can be employed include, among others, inorganic compounds such as, the titanium halides, for example, titanium trichloride, titanium tetrachloride, titanium tetrabromide, titanium tetraiodide, and the like, titanium sulfate, titanium nitrate; the organic titanium compounds, such as titanium oxalate, titanium acetonylacetonate, the alkyl titanates such as the butyl titanates, and the like. The titanium can be introduced with the vanadium salt or after formation of the vanadium pentoxide matrix. An additional activation step, i.e., oxygen-containing gas at elevated temperatures, is required in the latter case.

As previously indicated, at least one of the noble metal components of the catalyst must be palladium or a palladium-containing compound. If additional noble metals or noble metal-containing compounds are employed, they are chosen from those which are or contain platinum, ruthenium, iridium, or osmium. Illustrative compounds which can be employed in addition to the noble metals themselves include the halides, e.g., palladium chloride, ruthenium chloride, osmium chloride, platinum chloride, iridium chloride, palladium nitrate, organic noble metal compounds, such as the acetates and acetonyl acetonates, e.g., palladium acetate, ruthenium acetate, palladium acetonyl acetonate, and the like or the noble metals themselves.

A preferred class of palladium compounds which can be applied with advantage as a source of palladium are palladium-transition metal oxides; in most cases salts in which palladium usually plays the role of the cation and the transition metal is part of the anion. The palladium salts mentioned above are usually formed either from $M_x$-$O_y$ acids or from their ammonium salts by cation exchange with palladium. (M represents transition metals; O represents oxygen; and $x$ and $y$ whole numbers). Examples of this class of compounds are the palladium salts of vanadates, chromates, titanates, manganates, and the like. These compounds upon application by themselves on alpha-alumina support usually show only little activity; however, upon application on supported vanadium pentoxide and upon doping by heat treatment they give rise to catalysts of excellent catalystic properties (selectivity, activity, Pd-utilization). As mentioned above, the titanium system, in particular, shows enhanced activity. The preferred method for the application of these compounds is through their solutions, but high solubility of these compounds is not a requirement. In certain cases these palladium compounds may be prepared and applied at the same time in the presence of the supported vanadium oxide.

As hereinbefore indicated the process of this invention can be utilized for the preparation of carbonyl-containing compounds from a wide range of unsaturated hydrocarbons. The process is particularly attractive for conversion of lower alkenes to aldehydes and ketones. For example, ethylene can be converted to acetaldehyde, propylene to acetone, n-butenes to methyl ethyl ketone and the like. Illustrative other unsaturated compounds which can be employed include, among others, higher alkenes, cycloalkenes, dienes and aralkyl compounds such as toluene.

In contrast to many of the processes presently in use, the conversion of the olefinic compounds is conducted in ths vapor phase and at moderate temperatures. A wide variety of known vapor phase techniques and engineering designs can be employed. For example, the catalyst can be utilized in any of several fixed, moving or fluidized bed systems through which the unsaturated compound and oxygen pass and from which the reaction products are withdrawn and separated.

Another important feature of the process of this invention is the flexibility in feed composition. The oxygen, unsaturated compound and water can be varied over wide ranges dictated so as to circumvent the explosion limits. Saturated alkanes such as methane or ethane may be used as diluents. Minor concentrations of acetylene or allene; which are deleterious in the solution oxidation of ethylene with $PdCl_2$-$CuCl_2$, can be tolerated by the catalyst of this invention.

The following examples are illustrative:

EXAMPLE I

A concentrated hydrochloric acid solution (3 liters) containing 489 grams of $NH_4VO_3$ and 32 grams of $PdCl_2$ was spray dry deposited on 1806 grams of alpha-$Al_2O_3$. After loading, the catalyst was activated by heating at 400° C. in a stream of air for 16 hours. Elemental analysis indicated that the catalyst contained 0.8% Pd and 10% V by weight.

A 100 gram sample of the catalyst was placed in a vertical Pyrex tube. A premixed gas stream consisting of ethylene, air and water vapor, in a respective mole ratio of 1:20:9 was introduced to the catalyst at 1 atmosphere at the rate of 23 liters/hour with a contact time of 11 seconds; this set of conditions are henceforth referred to as the standard conditions. The temperature of the catalyst bed was maintained at 140° C. The effluent was analyzed both by gas chromatography, by isolation and spectral techniques. The conversion of ethylene was 75% and the efficiency to acetaldehyde was 69%. Minor products were acetic acid and $CO_2$. At 115° C. the conversion of ethylene was 19%.

A catalyst prepared as described above and operated continuously at 140° C. for over 160 hours showed no change in activity or selectivity.

EXAMPLE II

A 40 gram sample of the catalyst described in Example I was placed in a glass-lined, steel, tubular reactor maintained at 115 pounds per square inch absolute (p.s.i. abs.) pressure and at a temperature of 146° C. A feed consisting of $C_2H_4$, $O_2$, $N_2$, and water vapor in the ratio 1:3.5:26.5:3.2 was introduced to the catalyst at the rate of 65 liters/hour (STP). The conversion of ethylene was 36% (38 mmole/hour) and the efficiency to acetaldehyde was 68%. During a run of 110 hours duration, there was less than a 15% decline of activity. (In other experiments, it was found that substantially higher space time yields of acetaldehyde could be obtained by judicious choice of temperature, pressure, and gas velocity.)

In another experiment with a catalyst prepared as in Example I and utilized under conditions similar to those above for an extended period, a decline in activity similar to that above was observed. The catalyst was restored to its original level to activity by treatment with air for 1.5 hours at 400° C.

EXAMPLE III

A catalyst was prepared as described in Example I except that the metals were introduced as $Pd(OAc)_2$ and vanadyl acetonylacetonate. A methanol solution of 111.4 grams of vanadyl acetonylacetonate and 4.1 grams of $Pd(OAc)_2$ were spray-dry deposited into 180.6 grams of alpha-$Al_2O_3$ and the catalyst was then activated at 400° C. for 16 hours. Activity and selectivity were virtually identical to the catalyst prepared from the halide salts. Under the above conditions, conversion of ethylene was 76% and the efficiency to acetaldehyde 66%.

EXAMPLE IV

An aqueous nitric acid solution (pH approximately 1) of $CrO_3$ and $Pd(NO_3)_2$ in a 1:1 molar ratio was added slowly to 30% aqueous ammonia. Yellow crystals formed immediately with an approximate composition of $Pd(NH_3)_4CrO_4$.

A sample of $V_2O_5$ supported on alpha-$Al_2O_3$ was prepared by spray-drying 489 grams of $NH_4VO_3$ dissolved in 2,500 cubic centimeters of HCl onto 1806.0 grams of support. The $V_2O_5$ phase was developed by calcination at 400° C. for 16 hours. A 264.2 gram sample of this material was loaded by the spray-dry method with 600 ml. of an aqueous solution containing 6.4 grams of the Pd-Cr compound described above. After this application the catalyst was calcined for 48 hours at 400° C. in air.

A 40 gram sample of this catalyst was placed in a glass lined, steel, tubular reactor and maintained at 145° C. and 115 p.s.i. abs. A feed consisting of ethylene, nitrogen, oxygen and water vapor in the ratio of 1:22:3:3 was introduced to the catalyst at the rate of 66 liters/hour. The conversion of ethylene was 21 mmole per hour and the efficiency to acetaldehyde was 83%.

EXAMPLE V

A solution (containing some suspended material) of 10.8 grams of ammonium metavanadate, 86.8 grams of $(NH_4)_6W_7O_{24} \cdot 6H_2O$ and 5.16 grams of $Pd(NO_3)_2$ in 1500 milliliters of hot water was sprayed onto 180.6 grams of alpha-alumina. The catalyst was activated in air for 16 hours at 400° C.

A 40 gram sample of the catalyst was placed in a glass lined, steel, tubular reactor under a pressure of 115 p.s.i. abs. and at 146° C. A feed consisting of ethylene, nitrogen, oxygen and water vapor in the ratio 1:24:2.7:3.5 was introduced to the catalyst at a rate of 64 liters/hour. The conversion of ethylene was 42% (42 mmole/hr.) and the efficiency to acetaldehyde was 61%.

Using the same volume of catalyst, temperature and pressure but operating in a stainless steel, recirculating, back mixed reactor similar results are obtained. With a feed consisting of ethylene, air and water in the ratio of 1:15:2 which was introduced at the rate of 60 liters/hour, the conversion of ethylene was 30%; the efficiency to acetaldehyde was somewhat lower due to the back mixing of the product.

EXAMPLE VI

A solution of 37 grams of palladium nitrate in 1 liter of water was added in a dropwise manner during 1 hour to a stirred solution of 50 grams of ammonium metavanadate in 4 liters of water. A solution 1 M in ammonia was simultaneously added as needed to maintain the pH close to 6. When the additions were complete the resulting orange product containing 17.7% palladium and 30.7% vanadium (palladium polyvanadate) was separated by sedimentation from the hydrous palladium oxide simultaneously formed in the reaction. The orange product was desiccated *in vacuo* overnight. The resulting dried product was identified by X-ray diffraction as a palladium polyvanadate. 38 grams of this product were obtained.

A solution of 20 grams of ammonium chloride in 500 milliliters of water was heated to boiling and 4 grams of palladium polyvanadate added to it. The mixture was spray dried onto 200 grams of alpha-alumina which already contained 17% by weight of vanadium pentoxide. A portion of the complete catalyst was heated for 66 hours in air at 400° C. It contained 0.4% by weight of Pd.

A 40 gram sample of this catalyst was placed in a glass lined, steel, tubular reactor under a pressure of 115 p.s.i. abs. and at a temperature of 146° C. A feed consisting of ethylene, oxygen, nitrogen, and water vapor in the ratio of 1:2.3:16.5:1.75 was introduced to the catalyst at the rate of 64 liters/hour (STP). The conversion of ethylene was 20% (25 mmole/hour) and the efficiency to acetaldehyde was 80%. After 124 hours of continuous operation, there was an approximately 10% decline in activity but the selectivity was essentially the same.

A catalyst was prepared as described above except that the palladium polyvanadate was introduced to the $V_2O_5$ alpha-$Al_2O_3$ system by soaking rather than spraying and the palladium was present in the final catalyst to the extent of 0.1% by weight.

The catalyst was utilized in the reactor described above with a feed of ethylene, oxygen, nitrogen and water vapor in the ratio of 1:3:27:3.5. The conversion of ethylene was 26.5% (25 mmole/hour) and the efficiency to acetaldehyde was 80%.

EXAMPLE VII

In order to demonstrate the necessity of activating the catalyst prior to use, a catalyst was prepared as described in Example I except that it was heated in helium instead of air at 400° C. for 16 hours. This afforded a system that was totally inactive for the conversion of ethylene under the standard reaction conditions i.e., those set forth in Example I. When the same catalyst was activated in air at 120° C. instead of 400° C. for 16 hours the system was also totally inactive.

EXAMPLE VIII

A catalyst prepared as in Example I was reduced with hydrogen for 24 hours at 400° C. Under the standard reaction conditions, the conversion of ethylene was erratic, settling at about 24% with low efficiency to acetaldehyde.

EXAMPLE IX

In order to demonstrate the stability of the catalysts of this invention a catalyst was prepared which did not contain vanadium. The catalyst was prepared by spray dry deposition of an HCl solution of 6.4 grams $PdCl_2$ to 361.2 grams of alpha $Al_2O_3$ followed by activation at 400° C. in air for 16 hours. The catalyst contained 1.3% Pd. Under the standard operating conditions, initial results (first hour) indicated a 49% conversion of ethylene and a low efficiency to acetaldehyde. Within 4 hours however, the activity had virtually disappeared; conversions were down to 6% and the efficiency to acetaldehyde was less than 10%.

Similarly, a catalyst prepared as described in U.S. Pat. 3,419,618 by depositing palladium metal or $Pd(NO_3)_2$ on alpha-$Al_2O_3$ and converting to PdO, as indicated by X-ray diffraction, showed a short life (few hours) and low activity. The catalyst contained about 0.8% Pd by weight.

EXAMPLE X

A catalyst was prepared as in Example I except that ruthenium chloride was substituted for the palladium chloride. The ruthenium-vanadium atomic ratio was the same as the palladium-vanadium ratio of Example I. The catalyst was inactive under standard conditions; the conversion of ethylene was less than 1%. Another catalyst was prepared by depositing ruthenium chloride on a catalyst containing $V_2O_5$ on alpha $Al_2O_3$ and activating at 400° C. for 16 hours. This catalyst was also inactive under the standard conditions employed.

EXAMPLE XI

In order to demonstrate the inactivity of ruthenium alone, a hydrochloric acid solution of 8.16 grams of $RuCl_3$ was spray deposited on 391.8 grams of alpha-$Al_2O_3$ and then activated at 400° C. for 16 hours. Under the standard reaction conditions the catalyst was inactive; the conversion of ethylene amounted to less than 1%.

EXAMPLE XII

A solution of 369.6 grams of $(NH_4)_6Mo_7O_{24} \cdot 4H_2O$ and 16 grams of $PdCl_2$ in approximately 2 liters of aqueous ammonium hydroxide (pH 8) was spray deposited onto 903 grams of alpha alumina. The catalyst was then activated in air at 400° C. For 16 hours.

A 40 gram sample of the catalyst was placed in a stainless steel recirculating, back-mixed autoclave reactor. A feed consisting of ethylene, air and water vapor was introduced to the catalyst in the ratio of 1:15.5:1.7 at the rate of 65 liters/hour (STP). There was no reaction at 145° C. and the temperature was gradually raised to 190° C. At the higher temperature the only detectable product was $CO_2$.

EXAMPLE XIII

A solution (some suspended material) of 217 grams of $(NH_4)_6W_7O_{24} \cdot 6H_2O$ and 14.8 grams of $Pd(NO_3)_2$ in about 2 liters of water (pH 6) was spray dried onto 451.5 grams of alpha-alumina. The resultant catalyst was activated in air at 400° C.

A 40 grams sample of the catalyst was placed into a stainless steel, recirculating, back-mixed autoclave reactor under 115 p.s.i. abs. pressure and at 145° C. A feed consisting of ethylene, air and water vapor in the ratio of 1:15.5:1.7 was introduced to the catalyst at the rate of 65 liters/hour. No conversion or ethylene was evident at 145° C. and the temperature was raised to 165° C. Under these conditions a small conversion of ethylene (<3%) was evident and $CO_2$ and $CH_3CO_2H$ were detected.

EXAMPLE XIV

In order to demonstrate the effect of the presence of a second noble metal on ethylene conversion, a catalyst was prepared as in Eaxmple I except that $RuCl_3$ was added. After the $PdCl_2$ and $NH_4VO_3$ had been deposited, a hydrochloric acid solution of $RuCl_3$ was introduced. The catalyst was next activated at 400° C. in air for 16 hours. Elemental analysis of the activated catalyst indicated 0.8% Pd, 0.1% Ru and 9.8% V. With the feed used in Example I but a temperature of 135° C. (contact time 11 seconds), the conversion of ethylene was 88% and the efficiency to acetaldehyde was 57%. At 125° C. the conversion was 47% and the efficiency to acetaldehyde was 72%. At 111° C. the conversion was 35% and the efficiency to acetaldehyde was 90%.

EXAMPLE XV

The catalyst was prepared as in Example XIV except that the activated catalyst contained 0.8% Pd and 0.46% Ru and 10% V. At 113% C. the conversion of ethylene was 60%; the efficiency to acetaldehyde was 87%. A separate sample of catalyst was run continuously for 70 hours and showed no change in activity or selectivity during that period.

EXAMPLE XVI

The catalyst was prepared as described in Eaxmple XIV except that the activated catalyst contained 0.8% Ru. At 111° C. with the same feed as in Example I a 50% conversion of ethylene was observed and the efficiency to acetaldehyde was 86%. A separate sample was run for 1 week with no change in activity or selectivity.

EXAMPLE XVII

A catalyst was prepared by spray-dry deposition of an HCl solution of $IrCl_3$, $PdCl_2$ and $NH_4VO_3$ onto alpha $Al_2O_3$. The catalyst was then activated in air at 400° C. for 16 hours. The atomic ratio of Pd, Ir and V in the catalyst is 1:1:25. The catalyst was very active under standard conditions and at 115° C. with standard feeds, conversion of ethylene was 70% and efficiency to acetaldehyde was 70%. No change in conversion or efficiency was observed during 48 hours.

EXAMPLE XVIII

A catalyst was prepared as described in Example XVII except that platinum was employed in place of ruthenium. The catalyst was activated in air at 400° C. for 16 hours. The Pd and Pt were present in an atomic ratio of 1:1. At 120° C. using the feed conditions described in Example I, the conversion of ethylene was 80% and the efficiency to acetaldehyde was 80%. A sample of this catalyst was run at 120° C. for over 100 hours without any diminution in activity.

EXAMPLE XIX

A catalyst was prepared and activated as described in Example X. It was then loaded via the same spray technique with an HCl solution of $PdCl_2$ and then reactivated in air at 400° C. The final catalyst contained 0.8% Pd, 0.9% Ru and 8% V by weight.

At 130° C. (contact time 11 seconds) with a standard feed an 85% conversion of ethylene was observed with 55% efficiency to acetaldehyde. At 115° C. conversion was 60% and efficiency to acetaldehyde 83%. The activity and selectivity of this catalyst were undiminished after 200 hours of use.

EXAMPLE XX

A palladium peroxytitanate compound was prepared by addition of $Pd(NH_3)_4Cl_2$ to a solution resulting from the addition of $TiCl_4$ to excess $H_2O_2$ and adjustment of the pH to 8–10 with excess ammonia. A solution of 3.2 grams of the palladium peroxytitanate in a mixture of aqueous ammonia (150 cc.) and 30 percent $H_2O_2$ (350 cc.) was sprayed onto 253.1 grams of a support containing 17 percent $V_2O_5$ and 83 percent $\alpha$-$Al_2O_3$. The catalyst was activated at 400° C. in air for 48 hours prior to use. The catalyst contains 0.4 percent palladium, 0.4 percent titanium by weight.

A 40 gram sample of the catalyst described above was placed in a glass lined stainless steel tubular reactor maintained at 115 p.s.i. abs. and at a temperature of 146° C. A feed consisting of $C_2H_4$, $O_2$, $N_2$, and $H_2O$ (gaseous), in the ratio 1:3:21:3 was introduced to the catalyst at the rate of 65 liters/hour (STP). The conversion of ethylene after one day was 41 mmole/hr. and the efficiency to acetaldehyde was 75 percent. Under other conditions (higher flows and temperatures) yields of acetaldehyde of >2.5 mole/l. cat./hr. were achieved.

EXAMPLE XXI

A solution of 109.3 grams $NH_4VO_3$, 3.34 grams $PdCl_2$ and 5 cc. $TiCl_4$ in that order, were dissolved in 1 liter of hot hydrochloric acid, concentrated to 800 cc. and spray-dried onto 409 grams of alumina. The final composition contained 0.4 percent Pd, 0.4 percent Ti and 17 percent vanadium pentoxide by weight. The sample was then activated at 400° C. for 40 hours. Utilization of the catalyst under the conditions described in Example XX resulted in conversion of 44 mmole of ethylene/hour with an efficiency to acetaldehyde of 75 percent.

A catalyst prepared in the same way but containing 0.1% Pd, 0.4% Ti and 17% vanadium pentoxide was found to be much more active than a catalyst with 0.1% Pd and 17% vanadium pentoxide. Comparative experiments were carried out in a stainless steel, back mixed autoclave reactor. Catalyst samples of 40 cc. were utilized and the conditions were: temperature, 170° C.; pressure, 115 p.s.i. absolute. About 200 l./hr. (STP) of a mixture of $C_2H_4$, $O_2$, $N_2$ and $H_2O$ (gaseous) in the ratio 1:1.6:14:2 were fed to the catalyst. With the Pd-Ti-V catalyst the conversion of ethylene was 135 mmole/hr. and the efficiency to acetaldehyde was 68%. With the Pd-V catalyst the conversion was 76 mmole/hr. and the efficiency to acetaldehyde was 71%.

EXAMPLE XXII

A solution of 129.3 grams of $NH_4VO_3$ and 6.0 cc. of $TiCl_4$ were dissolved in 1 liter of hot HCl and spray-dried onto 484.3 grams of $\alpha$-$Al_2O_3$. After activation in air at 400° C. the material contained 0.4 percent titanium and 17 percent vanadium pentoxide by weight. A solution of 0.88 grams of palladium polyvanadate (see Example VI) in 40 ml. of 4 M $NH_4Cl$ was soaked onto 150 grams of the titanium-vanadium-alumina system described above. The system was then dried at 120° C. for 3 hours and then calcined in air for 17 hours at 400° C. The final composition had approximately 0.1 percent by weight palladium. Utilization of this catalyst under the conditions described in Example XX resulted in conversion of 32 mmole of ethylene/hour with an efficiency to acetaldehyde of 72 percent.

EXAMPLE XXIII

Using the reagents and proportions described in Example I but applying the active components to the support by soaking followed by slow vacuum removal of the solvent afforded a catalyst somewhat inferior to that of Example I. The catalyst particles were more friable, crusts developed on the surface of the catalyst and loss of some of the active components occurred during the first few hours of operation.

Conversion of ethylene and efficiencies to acetaldehyde were generally 10–15% lower than in Example I at similar conditions. Reactivation of this catalyst after use for an additional 63 hours at 400° C. in air resulted in an improvement in the catalyst performance.

EXAMPLE XXIV

An experiment with propylene was carried out with the catalyst described in Example I and under substantially the same conditions as in Example I. The only differences were that the temperature was 165° C. (contact time 6 sec.), and the feed consisted of propylene (1.4 l./hr.), air (28 l./hr.) and water vapor (10 l./hr.). The conversion of propylene was 43%. The over-all efficiency to acetone was 76%. A separate sample of this catalyst was operated continuously for over 40 hours without change in behavior.

Under these same conditions with a catalyst prepared as in Example I but containing 2% Pd by weight and operating at 150° C. (contact time 9 sec.) similar results were obtained. The conversion was 45% and efficiency to acetone 70%.

EXAMPLE XXV

The catalyst was prepared as in Example XVII and utilized in a Pyrex tubular reactor at 160° C. and 1 atmosphere. The feed consisted of 1-butene, air and water vapor in the ratio 1:20:17 at the rate of 27.5 liters/hour. The conversion of 1-butene under these conditions was about 18%. The efficiency to methyl ethyl ketone was 55%. The major side products were acetic acid, and to a lesser extent, acetaldehyde. Similar results were obtained starting from 2-butene.

EXAMPLE XXVI

A catalyst was prepared as described in German Pat. 1,049,845 Example XXIII, and utilized under the conditions of Example I; this preparation does not involve doping by heat treatment. Elemental analysis indicated that the catalyst contained 0.7% Pd, 1.7% Cu. 0.4% Fe and 0.5% V; on $\alpha$-alumina. Under the conditions of Example I the initial conversion of ethylene was 69% with a selectivity to acetaldehyde of 87%. Within 23 hours, however, the conversion had declined to 36%.

Although the invention has been illustrated by the preceding examples, it is not to be construed as being limited to the materials employed therein, but rather, the invention encompasses the generic area as hereinbefore disclosed. Various modifications and embodiments thereof can be made without departing from the spirit and scope thereof.

What is claimed is:

1. A process for the preparation of a catalyst useful in the oxidation of unsaturated hydrocarbons to carbonyl-containing compositions which process comprises the steps of:
   (1) forming a mixture of:
      (i) a vanadium salt, and at least one component selected from the group consisting of:
         (a) a palladium salt and a titanium salt, and
         (b) a palladium salt and a metal salt wherein said metal is selected from the group consisting of platinum, ruthenium, iridium or osmium, and
   (2) doping said component into said vanadium salt by heating at a temperature of from about 200° C. to about 500° C. for at least 5 hours in the presence of oxygen or an oxygen containing gas.

2. The process of claim 1 wherein said doping is effected by heating at a temperature of about 400° C. for about 16 hours.

3. The process of claim 1 wherein said catalyst is contained on a carrier.

4. The process of claim 3 wherein said carrier is alpha-alumina.

5. The process of claim 1 wherein said mixture is formed by spray-dry depositing onto a carrier a solution of said vanadium salt and said component.

6. The process of claim 5 wherein said solution contains ammonium vanadate.

7. The process of claim 5 wherein said solution contains vanadium acetonylacetonate.

8. The process of claim 5 wherein said solution contains palladium chloride.

9. The process of claim 5 wherein said solution contains palladium acetonylacetonate.

10. The process of claim 5 wherein said solution contains ammonium vanadate and palladium chloride.

11. The process of claim 5 wherein said solution contains ammonium vanadate, palladium chloride and titanium chloride.

12. The process of claim 5 wherein said solution contains ammonium vanadate, palladium chloride and ruthenium chloride.

13. The process of claim 5 wherein said solution contains vanadyl chloride.

14. The process of claim 5 wherein said solution contains a palladium salt selected from the group consisting of palladium vanadate, palladium chromate, palladium titanate and palladium manganate.

15. The process of claim 14 wherein said salt is palladium chromate.

16. The process of claim 14 wherein said salt is palladium titanate.

17. The process of claim 14 wherein said palladium salt is palladium polyvanadate.

18. A catalyst prepared by the process of claim 14.

19. A doped catalyst comprised of a vanadium oxide and minor portions of:
   (a) palladium oxide and at least one of
   (b) titanium oxide, or
   (c) metal oxide wherein said metal of said oxide is selected from the group consisting of platinum, ruthenium, iridium or osmium.

20. The catalyst of claim 19 comprised of from about 1 to about 20 weight percent vanadium oxide, from about 0.01 to about 1.0 weight percent palladium oxide, and titanium oxide in an amount up to about 40 weight percent based on the weight of vanadium.

21. The catalyst of claim 19 contained on a support.

22. The catalyst of claim 19 contained on alpha-aluminum oxide.

23. The catalyst of claim 19 wherein said vanadium oxide is present in an amount of from about 1 to about 99.5 percent by weight.

24. The catalyst of claim 19 wherein palladium oxide is present in an amount of from about 0.001 to about 20 percent by weight.

25. The catalyst of claim 19 wherein ruthenium oxide is present in an amount of from about 0.001 to about 3 percent by weight.

References Cited

UNITED STATES PATENTS

| | | | |
|---|---|---|---|
| 3,106,579 | 10/1963 | Hornig et al. | 260—597 B |
| 3,207,703 | 9/1965 | Innes et al. | 252—464 X |
| 3,240,805 | 3/1966 | Naglieri | 252—441 X |
| 3,523,964 | 8/1970 | Kober et al. | 252—472 X |
| 3,563,963 | 2/1971 | Beier et al. | 252—472 X |

FOREIGN PATENTS

| | | | |
|---|---|---|---|
| 913,449 | 12/1962 | Great Britain | 252—464 |
| 1,568,742 | 4/1969 | France | 252—597 B |

DANIEL E. WYMAN, Primary Examiner
W. J. SHINE, Assistant Examiner

U.S. Cl. X.R.

252—466 PT, 470, 472; 260—597 B